(12) United States Patent
Abe et al.

(10) Patent No.: US 10,737,406 B2
(45) Date of Patent: Aug. 11, 2020

(54) MEMBER SURFACE TREATMENT METHOD AND METHOD FOR PRODUCING MULTILAYER MEMBER

(71) Applicant: The Yokohama Rubber Co., LTD., Minato-ku, Tokyo (JP)

(72) Inventors: Megumi Abe, Hiratsuka (JP); Yuichi Matsuki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 180 days.

(21) Appl. No.: 16/071,881

(22) PCT Filed: Jan. 10, 2017

(86) PCT No.: PCT/JP2017/000444
§ 371 (c)(1),
(2) Date: Jul. 20, 2018

(87) PCT Pub. No.: WO2017/126361
PCT Pub. Date: Jul. 27, 2017

(65) Prior Publication Data
US 2019/0030758 A1 Jan. 31, 2019

(30) Foreign Application Priority Data
Jan. 21, 2016 (JP) .................. 2016-009994

(51) Int. Cl.
*B29B 13/08* (2006.01)
*B29C 65/48* (2006.01)
(Continued)

(52) U.S. Cl.
CPC .............. *B29B 13/08* (2013.01); *B29C 59/08* (2013.01); *B29C 59/10* (2013.01); *B29C 59/14* (2013.01);
(Continued)

(58) Field of Classification Search
CPC ......... B29C 59/08; B29C 59/10; B29C 59/14; B29C 65/48; B32B 27/00; B32B 37/12;
(Continued)

(56) References Cited

U.S. PATENT DOCUMENTS

2012/0133868 A1* 5/2012 Sato ..................... B32B 27/00
349/96
2013/0344268 A1 12/2013 Choi
(Continued)

FOREIGN PATENT DOCUMENTS

JP H03-155941 7/1991
JP H08-502767 3/1996
(Continued)

OTHER PUBLICATIONS

Translation of JP-2013253155-A (Year: 2013).*
(Continued)

*Primary Examiner* — Daniel McNally
(74) *Attorney, Agent, or Firm* — Thorpe North & Western

(57) ABSTRACT

Provided is a member surface treatment method for treating a surface of a member containing a crystallizable thermoplastic resin by a dry treatment, wherein the dry treatment is performed so as to satisfy the following conditions X and Y. Condition X: $\gamma^d/\gamma^{d0}$ is not less than 1.0 and less than 1.4. Condition Y: $\gamma^p/\gamma^{p0}$ is not less than 1.2 and less than 40. $\gamma^{d0}$ is a non-polar component of surface free energy of the surface before the dry treatment, $\gamma^d$ is a non-polar component of surface free energy of the surface after the dry treatment, $\gamma^{p0}$ is a polar component of surface free energy of the surface before the dry treatment, and $\gamma^p$ is a polar component of surface free energy of the surface after the dry treatment.

8 Claims, 1 Drawing Sheet

(51) Int. Cl.
    *B29C 59/14*     (2006.01)
    *B29C 59/08*     (2006.01)
    *B32B 27/00*     (2006.01)
    *C08J 7/12*      (2006.01)
    *B29C 59/10*     (2006.01)
    *C09J 5/02*      (2006.01)
    *B32B 37/12*     (2006.01)
    *B32B 38/00*     (2006.01)
    *B29C 59/16*     (2006.01)
    *B29C 35/08*     (2006.01)
    *B32B 7/12*      (2006.01)
    *B32B 27/08*     (2006.01)

(52) U.S. Cl.
    CPC .............. *B29C 65/48* (2013.01); *B32B 27/00* (2013.01); *B32B 37/12* (2013.01); *B32B 38/0008* (2013.01); *C08J 7/12* (2013.01); *C08J 7/123* (2013.01); *C09J 5/02* (2013.01); *B29C 59/16* (2013.01); *B29C 2035/0827* (2013.01); *B29C 2059/145* (2013.01); *B29C 2059/147* (2013.01); *B29K 2995/0092* (2013.01); *B32B 7/12* (2013.01); *B32B 27/08* (2013.01); *B32B 2250/02* (2013.01); *B32B 2605/08* (2013.01); *C08J 2323/12* (2013.01); *C09J 2400/226* (2013.01); *C09J 2400/228* (2013.01)

(58) Field of Classification Search
    CPC ......... B32B 38/0008; C08J 7/12; C08J 7/123; C09J 5/02
    See application file for complete search history.

(56) References Cited

U.S. PATENT DOCUMENTS

2014/0037882 A1    2/2014   Georgeau et al.
2014/0190613 A1    7/2014   Choi
2015/0315420 A1    11/2015  Georgeau et al.

FOREIGN PATENT DOCUMENTS

| JP | 2010-222541 | | 10/2010 |
| JP | 2013-253155 | | 12/2013 |
| JP | 2013253155 A | * | 12/2013 |
| JP | 2014-025000 | | 2/2014 |
| JP | 2014025000 A | * | 2/2014 |
| WO | WO 1994/04601 | | 3/1994 |
| WO | WO 2013/161647 | | 10/2013 |

OTHER PUBLICATIONS

Translation of JP-2014025000-A (Year: 2014).*
European Search Report for European Application No. 17741241.8 dated Aug. 20, 2019, 6 pages, Germany.
International Search Report for International Application No. PCT/JP2017/000444 dated Apr. 11, 2017, 4 pages, Japan.

* cited by examiner

MEMBER SURFACE TREATMENT METHOD AND METHOD FOR PRODUCING MULTILAYER MEMBER

TECHNICAL FIELD

The present technology relates to a member surface treatment method and a method for producing a multilayer member.

BACKGROUND ART

A steel plate is used for interior and exterior parts of an automobile, such as a body, a front door, a rear door, a back door, a front bumper, a rear bumper, and a rocker molding of an automobile in a related art. From the viewpoint of weight reduction in an automobile, partial use of a crystallizable thermoplastic resin such as a polypropylene resin is increased.

In a case of using a resin for interior and exterior parts of an automobile as described above, a primer composition is usually applied to an adhesion face of a resin member and an adhesive is then applied followed by adhering.

To eliminate a step of applying a primer composition, a method in which an adhesion face of a resin member is subjected to a dry treatment such as a flame treatment, a corona treatment, a plasma treatment, and ITRO treatment, in advance and a predetermined adhesive is applied directly to the adhesion face followed by adhering, to produce an adhesion member (multilayer member) has been also proposed (for example, Japan Unexamined Patent Publication No. 2014-25000).

Recently, the level of requirement for an automobile, such as safety and fuel consumption, has increased. Further improvement is required for the adhesion of a multilayer member (adhesion between adhered members).

When the present inventors produced a multilayer member using a member subjected to a dry treatment and an adhesive with reference to Japan Unexamined Patent Publication No. 2014-25000, they found that the adhesion of the multilayer member is not necessarily sufficient.

SUMMARY

The present technology provides a member surface treatment method capable of obtaining a member exhibiting excellent adhesion after formation of a multilayer member, and a method for producing a multilayer member using a member treated by the surface treatment method.

The present inventors have found that a member containing a crystallizable thermoplastic resin can be subjected to a dry treatment so as to satisfy a specific condition. Specifically, the present technology provides the following features.

(1) A member surface treatment method for treating a surface of a member containing a crystallizable thermoplastic resin by a dry treatment, wherein the dry treatment is performed to satisfy conditions X and Y:

(Condition X) $\gamma^d/\gamma^{d0}$ is not less than 1.0 and less than 1.4; and (Condition Y) $\gamma^p/\gamma^{p0}$ is not less than 1.2 and less than 40, where $\gamma^{d0}$ is a non-polar component of surface free energy of the surface before the dry treatment, $\gamma^d$ is a non-polar component of surface free energy of the surface after the dry treatment, $\gamma^{p0}$ is a polar component of surface free energy of the surface before the dry treatment, and $\gamma^p$ is a polar component of surface free energy of the surface after the dry treatment.

(2) The member surface treatment method according to (1), wherein the dry treatment includes a plurality of single dry treatments, and the surface free energy of the surface subjected to the single dry treatments is increased with the number of the single dry treatments increased in the whole treatment process of the dry treatment.

(3) A method for producing a multilayer member having a first member containing a crystallizable thermoplastic resin, an adhesion layer, and a second member in this order, the method including:

a surface treatment step of performing a surface treatment on a surface of the first member by the member surface treatment method according to (1) or (2);

an adhesive application step of applying an adhesive to the surface of the first member subjected to the dry treatment without a primer composition, to form an adhesive layer on the surface of the first member; and an adhering step of adhering the second member to the adhesive layer.

(4) The method for producing a multilayer member according to (3), further including a surface treatment step of performing a surface treatment on a surface of the second member before the adhering step by the member surface treatment method according to (1) or (2), wherein the second member contains a crystallizable thermoplastic resin, and in the adhering step, the surface of the second member in which the surface treatment is performed is adhered to the adhesive layer.

As described below, the present technology can provide a member surface treatment method capable of obtaining a member exhibiting excellent adhesion after formation of a multilayer member, and a method for producing a multilayer member using a member treated by the surface treatment method.

DETAILED DESCRIPTION

Figure 1A:
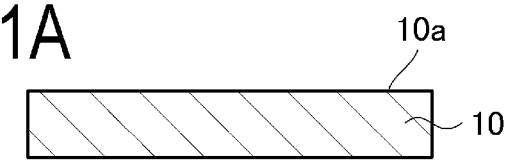
FIGS. 1A to 1D are cross-sectional views schematically illustrating an embodiment of a production method of the present technology in the order of steps.

Hereinafter, a member surface treatment method of the present technology and a method for producing a multilayer member of the present technology will be described.

Note that in the present specification, numerical ranges indicated using "(from) . . . to . . . " include the former number as the lower limit value and the later number as the upper limit value.

Member Surface Treatment Method

The member surface treatment method of the present technology (hereinafter sometimes simply referred to as "the surface treatment method of the present technology") is a member surface treatment method for treating a surface of a member containing a crystallizable thermoplastic resin by a dry treatment. Herein, the dry treatment is performed so as to satisfy the following conditions X and Y.

According to this configuration of the surface treatment method of the present technology, a member subjected to a surface treatment by the surface treatment method of the present technology is assumed to exhibit excellent adhesion after formation of a multilayer member. Although the reason is not clear, it is assumed to be as follows.

In the surface treatment method of the present technology, the surface of the member containing a crystallizable thermoplastic resin is subjected to the dry treatment so as to satisfy the following conditions X and Y (hereinafter, the conditions X and Y are collectively referred to as "specific conditions"). Thus, it is considered that the surface of the member is made hydrophilic without impairing the crystallizability of outermost surface of the member. Therefore, when the multilayer member is produced using a member surface-treated by the surface treatment method of the present technology and an adhesive, the adhesive is stabilized on the surface of the member made hydrophilic to form an adhesive layer sufficiently in contact with the entire surface, and a crystal structure of the outermost surface of the member acts as an anchor to strongly fix an adhesion layer formed from the adhesive layer onto the member. As a result, it is considered that a multilayer member to be obtained exhibits excellent adhesion without a primer composition.

A member used in the surface treatment method of the present technology will be first described, and a dry treatment will be then described in detail.

Member

The member (preferably substrate) containing a crystallizable thermoplastic resin is not particularly limited.

The crystallizable thermoplastic resin is not particularly limited as long as it is a thermoplastic resin having crystallizability. Specific examples thereof include a polyolefin resin such as polyethylene, polypropylene, and polybutylene; a methacrylate-based resin such as polymethyl methacrylate; a polystyrene-based resin such as polystyrene, ABS (acronitrile butadiene styrene), and AS (acronitrile styrene); a polyester-based resin such as polyethylene terephthalate (PET), polybutylene terephthalate (PBT), polytrimethylene terephthalate, polyethylene naphthalate (PEN), and poly(1,4-cyclohexyldimethylene terephthalate) (PCT); a polyamide resin selected from a nylon resin and a nylon copolymer resin such as polycaproamide (nylon 6), polyhexamethylene adipamide (nylon 66), polyhexamethylene sebacamide (nylon 610), polyhexamethylene dodecamide (nylon 612), polydedecane amide (nylon 12), polyhexamethylene terephthalamide (nylon 6T), polyhexamethylene isophthalamide (nylon 6I), polycaproamide/polyhexamethylene terephthalamide copolymer (nylon 6/6T), polyhexamethylene adipamide/polyhexamethylene terephthalamide copolymer (nylon 66/6T), and polyhexamethylene adipamide/polyhexamethylene isophthalamide copolymer (nylon 66/6I); a polyvinyl chloride resin; polyoxymethylene (POM); a polycarbonate (PC) resin; a polyphenylene sulfide (PPS) resin; a modified polyphenylene ether (PPE) resin; a polyetherimide (PEI) resin; a polysulfone (PSF) resin; a polyether sulfone (PES) resin; a polyketone resin; a polyether nitrile (PEN) resin; a polyether ketone (PEK) resin; a polyetherether ketone (PEEK) resin; a polyether ketone ketone (PEKK) resin; a polyimide (PI) resin; a polyamideimide (PAI) resin; a fluororesin; and modified resins obtained by modifying the resins, or a mixture of the resins. Among these, a polyolefin resin is preferable, polyethylene and polypropylene are more preferable, and polypropylene is even more preferable. The member used in the surface treatment method of the present technology may contain two or more kinds of crystallizable thermoplastic resin.

The content of the crystallizable thermoplastic resin in the member used in the surface treatment method of the present technology is preferably from 10 to 100 mass %, and more preferably from 60 to 100 mass %.

The member used in the surface treatment method of the present technology is preferably a composite member containing the crystallizable thermoplastic resin and an inorganic substance. Examples of the inorganic substance include silica, titanium oxide, magnesium oxide, antimony oxide, aluminum hydroxide, magnesium hydroxide, calcium hydroxide, calcium carbonate, talc, clay, mica, glass fibers, carbon black, graphite, and carbon fibers. The member used in the surface treatment method of the present technology may contain two or more kinds of inorganic substances.

Dry Treatment

The dry treatment is not particularly limited as long as it satisfies conditions X and Y (specific conditions) described below. It is preferable that the dry treatment be a dry treatment by irradiation with a high energy gas in a plasma state. The dry treatment may be performed on the entire or a part of surface of the member. When the member is a substrate, it is preferable that the dry treatment be performed on one surface of the substrate.

The kind of the dry treatment by irradiation with high energy gas in a plasma state is not particularly limited. The dry treatment is preferably at least one selected from the group consisting of a corona treatment, a plasma treatment, a flame treatment, ITRO treatment, an UV treatment (ultraviolet irradiation treatment), and an excimer treatment, more preferably a flame treatment, a plasma treatment, a corona treatment, or ITRO treatment, and further preferably a flame treatment or a plasma treatment.

The dry treatment may include a single dry treatment (once) (e.g., single sweeping treatment) or a plurality of single dry treatments (a plurality of times) (e.g., a plurality of sweeping treatments). When the dry treatment includes a plurality of single dry treatments, the single dry treatments may be performed without interval (continuous treatment), or the member may be subjected to the single dry treatment, cooling, and the next unit dry treatment (intermittent treatment).

When the dry treatment includes a plurality of single dry treatments, it is preferable that the surface free energy (non-polar component+polar component) of the surface of the member subjected to the single dry treatments be increased with the number of the single dry treatments increased in the whole treatment process of the dry treatment from the viewpoint of obtaining more excellent effects of the present technology.

Flame Treatment

The flame treatment is a surface treatment method using a flame.

In the flame treatment, a known method such as a method using a burner can be used.

The gas pressure in the flame treatment is preferably from 0.005 to 10 MPa, and more preferably from 0.01 to 1.5 MPa.

The speed in the flame treatment is preferably from 100 to 2000 mm/s, and more preferably from 200 to 1000 mm/s.

When the flame treatment is performed by using a burner, the distance between the burner and the surface of the member is preferably from 10 to 600 mm, and more preferably from 20 to 400 mm.

Plasma Treatment

The plasma treatment is a surface treatment method using plasma discharge.

The plasma treatment is not particularly limited. Examples thereof include an atmospheric pressure plasma treatment and a vacuum plasma treatment.

A plasma gas (processing gas) used in the plasma treatment is not particularly limited. Examples thereof include a nitrogen gas, a helium gas, and an argon gas, and a mixed gas including the aforementioned gas with one or more of an oxygen gas, a carbon dioxide gas, and a hydrogen gas.

The speed in the plasma treatment is preferably from 10 to 1500 mm/s, and more preferably from 50 to 1000 mm/s.

When the plasma treatment is performed by using a plasma discharge nozzle, the distance between the plasma discharge nozzle and the surface of the member is preferably from 1 to 100 mm, and more preferably from 5 to 50 mm.

Corona Treatment

The corona treatment is a surface treatment method using corona discharge.

The speed in the corona treatment is preferably from 10 to 1000 mm/s, and more preferably from 20 to 500 mm/s.

When the corona treatment is performed by using a corona discharge nozzle, the distance between the corona discharge nozzle and the surface of the member is preferably from 1 to 100 mm, and more preferably from 5 to 50 mm.

ITRO Treatment

In ITRO treatment, a silane compound or the like is introduced into a fuel gas to form a flame, and the flame is used to treat the surface, forming a nano-level silicon oxide film on the surface. Thus, the adhesive properties between the surface and the adhesive is improved.

The gas pressure in the ITRO treatment is preferably from 0.005 to 10 MPa, and more preferably from 0.01 to 1.5 MPa.

The speed in the ITRO treatment is preferably from 100 to 2000 mm/s, and more preferably from 200 to 1000 mm/s.

When the ITRO treatment is performed by using a burner, the distance between the burner and the surface of the member is preferably from 10 to 600 mm, and more preferably from 20 to 400 mm.

Conditions X and Y

The dry treatment is performed so as to satisfy the following conditions X and Y.

(Condition X) $\gamma^d/\gamma^{d0}$ is not less than 1.0 and less than 1.4; and (Condition Y) $\gamma^p/\gamma^{p0}$ is not less than 1.2 and less than 40.

Herein, $\gamma^{d0}$ is a non-polar component of surface free energy of the surface before the dry treatment, $\gamma^d$ is a non-polar component of surface free energy of the surface after the dry treatment, $\gamma^{p0}$ is a polar component of surface free energy of the surface before the dry treatment, and $\gamma^p$ is a polar component of surface free energy of the surface after the dry treatment.

It is preferred that $\gamma^d/\gamma^{d0}$ be from 1.1 to 1.3.

It is preferred that $\gamma^p/\gamma^{p0}$ be from 1.5 to 35.

When the dry treatment includes a plurality of single dry treatments, it is preferable that the polar component of surface free energy after each single dry treatment satisfy the condition Y and the polar component of surface free energy after the final single dry treatment be higher than the polar component of surface free energy before the final single dry treatment from the viewpoint of obtaining more excellent effects of the present technology.

When the dry treatment includes the plurality of single dry treatments, the surface free energy of the surface of the member after the dry treatment is the surface free energy of the surface of the member after the final single dry treatment.

Next, a method for determining surface free energy will be described.

The non-polar component (dispersive component) and the polar component of surface free energy of the surface of the member (hereinafter also referred to as "member surface") can be determined in accordance with the Owens and Wendt method (J. Appl. Polym. Sci., 13, 1741 to 1747 (1969)).

That is, a liquid having a known surface free energy (test liquid) is added dropwise to the member surface, the contact angle is measured, and the non-polar component and the polar component of surface free energy of the member surface are calculated by equations based on the Owens and Wendt theory (Equations (1) to (3) below).

$$1+\cos\theta = 2[(\gamma^d \cdot \gamma_L^d)/\gamma_L^2]^{1/2} + 2[(\gamma^p \cdot \gamma_L^p)/\gamma_L^2]^{1/2} \qquad \text{Equation (1):}$$

$$\gamma = \gamma^d + \gamma^p \qquad \text{Equation (2):}$$

$$\gamma_L = \gamma_L^d + \gamma_L^p \qquad \text{Equation (3):}$$

Herein, each symbol is as follows.

θ: contact angle of each test liquid $\gamma^d$: non-polar component of surface free energy of member surface $\gamma_L^d$: non-polar component of surface free energy of test liquid $\gamma^p$: polar component of surface free energy of member surface $\gamma_L^p$: polar component of surface free energy of test liquid In the present technology, water and diiodomethane (methylene iodide) are used as test liquids. As the surface free energy of water used as a test liquid, $\gamma_L^d$ of 21.8 mJm$^{-2}$ and $\gamma_L^p$ of 51.0 mJm$^{-2}$ are used, and as the surface free energy of diiodomethane used as a test liquid, $\gamma_L^d$ of 49.5 mJm$^{-2}$ and $\gamma_L^p$ of 1.3 mJm$^{-2}$ are used. These values are introduced into Equations (1) to (3) above and the value of contact angle used in each test liquid is introduced into the equation described above. Thus, the non-polar component and the polar component of surface free energy of the member surface can be calculated.

The contact angle is measured by a θ/2 method in accordance with "sessile drop method" described in JIS (Japanese Industrial Standard) R3257, in which the test liquid is added dropwise to the member surface at 25° C. and the wait time from drop adhesion to measurement is set to 5 seconds. As a measuring device for the contact angle, a portable contact angle meter (available from KRUSS) can be used.

When the conditions of the dry treatment (e.g., the aforementioned speed, and distance) are controlled, the dry treatment that satisfies the conditions X and Y can be performed.

Method for Producing Multilayer Member

The method for producing a multilayer member of the present technology (hereinafter sometimes simply referred to as "the production method of the present technology") is a method for producing a multilayer member having a first member containing a crystallizable thermoplastic resin, an adhesion layer, and a second member in this order, and includes three steps described below.

(1) Step 1: Surface Treatment Step

A step of performing a surface treatment on a surface of the first member containing a crystallizable thermoplastic resin by the surface treatment method of the present technology (2) Step 2: Adhesive Application Step A step of applying an adhesive to the surface of the first member subjected to the surface treatment without a primer composition, to form an adhesive layer on the surface of the first member subjected to the surface treatment (3) Step 3: Adhering Step A step of adhering the second member to the adhesive layer The production method of the present technology will be described with reference to the drawings.

FIGS. 1A to 1D are cross-sectional views schematically illustrating an embodiment of the production method of the present technology in the order of steps.

FIG. 1A illustrates a first member 10 used in the surface treatment step.

Figure 1B:

In the surface treatment step, a surface 10a of the first member 10 is subjected to a surface treatment by the surface treatment method of the present technology. Thus, a first member 12 after the surface treatment is obtained (FIG. 1B).

Figure 1C:
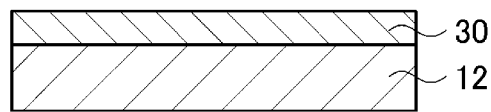

In the adhesive application step, the adhesive is applied to a surface 12a of the first member 12 after the surface treatment without a primer composition, to form an adhesive layer 30 on the surface 12a (FIG. 1C).

Figure 1D:
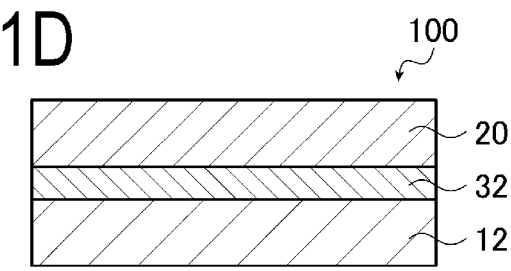

In the adhering step, a second member 20 is adhered to the adhesive layer 30. As a result, a multilayer member 100 having the first member 12, an adhesion layer 32 (a layer obtained by curing the adhesive layer 30), and the second member 20 in this order is obtained (FIG. 1D).

Hereinafter, each step will be described in detail.

Step 1: Surface Treatment Step

The surface treatment step is a step of performing a surface treatment on the surface of the first member containing a crystallizable thermoplastic resin by the surface treatment method of the present technology.

A specific and suitable aspect of the first member is the same as the member used in the surface treatment method of the present technology. When a multilayer member produced by the production method of the present technology is used as an exterior part of an automobile, such as a back door of an automobile, it is preferable that the first member be used as a member located on the inside (inner member).

The surface treatment method of the present technology is as described above.

Step 2: Adhesive Application Step

The adhesive application step is a step of applying an adhesive to the surface of the first member subjected to the surface treatment without a primer composition, to form an adhesive layer on the surface of the first member subjected to the surface treatment.

Adhesive

The adhesive is not particularly limited. Specific examples thereof include an acrylic adhesive, a rubber-based adhesive, a silicone-based adhesive, a urethane-based adhesive, an α-olefinic adhesive, an ether-based adhesive, an ethylene-vinyl acetate resin-based adhesive, an epoxy resin-based adhesive, a vinyl chloride resin-based adhesive, a chloroprene rubber-based adhesive, a cyanoacrylate-based adhesive, an aqueous polymer-isocyanate-based adhesive, a styrene-butadiene rubber-based adhesive, a nitrile rubber-based adhesive, a nitrocellulose-based adhesive, a reactive hot melt adhesive, a phenol resin-based adhesive, a modified silicone-based adhesive, a polyamide resin-based adhesive, a polyimide resin-based adhesive, a polyurethane resin-based adhesive, a polyolefin resin-based adhesive, a polyvinyl acetate resin-based adhesive, a polystyrene resin solvent-based adhesive, a polyvinyl alcohol-based adhesive, a polyvinyl pyrrolidone resin-based adhesive, a polyvinyl butyral resin-based adhesive, a polybenzoimidazole-based adhesive, a polymethacrylate resin-based adhesive, a melamine resin-based adhesive, a urea resin-based adhesive, and a resorcinol-based adhesive. At least one selected from the group consisting of a urethane-based adhesive, an epoxy-based adhesive, a modified silicone-based adhesive, and an acrylic adhesive is preferable, and a urethane-based adhesive is more preferable.

It is preferable that the urethane-based adhesive and the epoxy-based adhesive be a one-part or two-part adhesive.

Examples of the one-part urethane-based adhesive include a moisture-curing adhesive containing a urethane prepolymer having an isocyanate group.

Examples of the two-part urethane-based adhesive include an adhesive containing a main agent containing a polyol and a curing agent containing isocyanate.

Examples of the one-part epoxy-based adhesive include a normal temperature-curing or heating-curing adhesive containing a latent curing agent such as ketimine, oxazolidine, and aldimine compounds and a liquid epoxy resin.

Examples of the two-part epoxy resin-based adhesive include an adhesive containing a main agent selected from a liquid epoxy resin (e.g., a bisphenol A type epoxy resin, a bisphenol F type epoxy resin, a bisphenol AD type epoxy resin, or a novolac epoxy resin) and a curing agent (e.g., an amine-based curing agent such as a linear aliphatic amine, a cyclic aliphatic amine, and an aromatic amine, a nitrogen-containing aromatic amine such as an imidazole compound, and an amidoamine curing agent).

Application Method

A method for applying an adhesive to the surface of the first member subjected to the surface treatment is not particularly limited. Examples thereof include a dip coating method, a coating method with a double roll coater, a slit coater, an air knife coater, a wire bar coater, a slide hopper, spray coating, a blade coater, a doctor coater, a squeeze coater, a reverse roll coater, a transfer roll coater, an extrusion coater, a curtain coater, a dip coater, a die coater, or a gravure roll, a screen printing method, a dip coating method, a spray coating method, a spin coating method, and an inkjet method.

The thickness of the adhesive layer formed is not particularly limited and is preferably from 0.1 to 20 mm.

Step 3: Adhering Step

The adhering step is a step of adhering the second member to the adhesive layer described above.

Thus, a multilayer member having the first member, the adhesion layer (obtained by curing the adhesive layer), and the second member in this order is obtained.

Second Member

A material for the second member is not particularly limited and examples thereof include a resin, a glass, and a metal. Examples of the resin include the crystallizable thermoplastic resin described above.

When the multilayer member produced by the production method of the present technology is used as an exterior part of an automobile, such as a back door of an automobile, it is preferable that the second member be used as a member located on the outside (outer member).

From the viewpoint of further improving the adhesion between the second member and the adhesion layer, the surface of the second member may be subjected to coating or the aforementioned dry treatment before adhering the second member.

Adhering Method

A method for adhering the second member to the adhesive layer is not particularly limited and examples thereof include a pressure-bonding method. To cure the adhesive, a heating treatment or the like may be performed after adhering the second member.

When the second member contains the crystallizable thermoplastic resin, it is preferable that the production method of the present technology include a surface treatment step of performing a surface treatment on the surface of the second member by the surface treatment method of the present technology before the adhering step. In the adhering step, a surface of the second member subjected to a surface treatment is adhered to the adhesion layer.

Use

Since the adhesion of the multilayer member produced by the production method of the present technology is excellent, the multilayer member is especially useful in interior and exterior parts of an automobile, such as a body, a front door, a rear door, a back door, a front bumper, a rear bumper, and a rocker molding of an automobile.

EXAMPLES

The present technology will be described in further detail below. However, the present technology is not limited to these embodiments.

Preparation of Adhesive

Components shown in Table 1 below were mixed at the composition (part by mass) shown in Table 1 by a stirrer, to prepare a main agent shown in an upper part of Table 1 and a curing agent shown in a lower part of Table 1.

Subsequently, 100 g of the prepared main agent and 10 g of the curing agent were mixed to obtain an adhesive.

TABLE 1

|  |  | Adhesive |
|---|---|---|
| Main agent | Polymer 1 | 42.4 |
|  | Compound 1 | 1.7 |
|  | Compound 2 | 0.3 |
|  | Carbon black | 20.6 |
|  | Calcium carbonate 1 | 19.3 |
|  | Plasticizer 1 | 15.5 |
|  | Catalyst 1 | 0.2 |
|  | Total | 100.0 |
| Curing agent | Compound 3 | 45.9 |
|  | Compound 4 | 5 |
|  | Compound 5 | 2 |
|  | Calcium carbonate 2 | 46.8 |
|  | Catalyst 1 | 0.3 |
|  | Total | 100.0 |
| Main agent/curing agent (mass ratio) |  | 10/1 |

Details of the components in Table 1 are as follows.

Polymer 1: urethane prepolymer synthesized as described below 700 g of polyoxypropylene diol (average molecular weight: 2000), 300 g of polyoxypropylene triol (average molecular weight: 3000), and 499 g of 4,4'-diisocyanate phenylmethane (molecular weight: 250) were mixed (at this time, NCO/OH=2.0), 500 g of diisononyl phthalate was further added, and the mixture was stirred at 80° C. for 12 hours in a nitrogen gas stream, resulting in a reaction. A urethane prepolymer (polymer 1) containing 2.10% of isocyanate group was synthesized.

Compound 1: isocyanurate body of hexamethylene diisocyanate (Tolonate HDT available from Perstorp)

Compound 2: Dimerone (terpene resin, available from Yasuhara Chemical Co., Ltd.)

Compound 3: trifunctional polypropylene polyol (EXCENOL 1030 available from Asahi Glass Co., Ltd.)

Compound 4: polybutadienediol (Poly bd R-45HT available from Idemitsu Kosan Co., Ltd., hydroxyl value: 0.8 mol/kg)

Compound 5: terpineol (available from Yasuhara Chemical Co., Ltd.)

Carbon black: #200 MP (available from NSCC Carbon Co., Ltd.)

Calcium carbonate 1: Super S (available from Maruo Calcium Co., Ltd.)

Calcium carbonate 2: KALFAIN 200 (available from Maruo Calcium Co., Ltd.)

Plasticizer 1: diisononyl phthalate (available from Jay Plus, Inc.)

Catalyst 1: dimorpholinodiethyl ether (available from San-Apro Ltd.) Member surface treatment method One surface of a substrate (first member) (content of polypropylene: 80 mass %, content of inorganic substance (glass filler): 20 mass %) (width: 25 mm, length: 120 mm, thickness: 3 mm) formed from a polypropylene composite material (R-200G available from Prime Polymer Co., Ltd.) was subjected to a dry treatment under the treatment condition shown in Table 2. In Table 2, "flame" means a flame treatment, "ITRO" means ITRO treatment, "plasma" means a plasma treatment, and "corona" means a corona treatment. Details of each treatment will be described below. In Comparative Example 1, a dry treatment was not performed.

Production of Multilayer Member

Surface Treatment Step

As described above, one surface of the substrate (first member) formed from a polypropylene composite material was subjected to a dry treatment under the treatment condition described in Table 2.

Adhesive Application Step

Subsequently, the adhesive prepared as described above was applied to the treated surface of the first member, to form an adhesive layer (thickness: 3 mm).

Adhering Step

Further, another substrate that was coated (material: polypropylene) (thickness: 25 mm, length: 120 mm, thickness: 3 mm) (second member) was adhered and compression-bonded to the adhesive layer, and allowed to stand in an environment of 23° C. and a relative humidity of 50% for three days. As a result, a multilayer member having the first member, an adhesion layer (a layer obtained by curing the adhesive layer), and the second member was obtained.

Evaluation of Adhesion (Failure State, Failure Strength)

The obtained multilayer member was subjected to a shear test. A failure state was visually observed. The ratio of area of cohesive failure (CF) and the ratio of area of adhesive failure (AF) of the adhesive were examined. The results are shown in Table 2 (initial, failure state). The failure strength (shear strength) was measured. The results are shown in Table 2 (initial, failure strength).

The obtained multilayer member was subjected to a heat resistance test (at 80° C. for 240 hours). The same evaluation as described above was performed. The results are shown in Table 2 (after heat aging resistance).

Herein, "CF value" represents the ratio (%) of area of cohesive failure and "AF value" represents the ratio (%) of area of adhesive failure. For example, "CF90AF10" means that the ratio of area of cohesive failure is 90% and the ratio of area of interfacial failure is 10%.

As the ratio of area of cohesive failure is higher, the adhesion is more excellent. In practical terms, the ratio of area of cohesive failure is preferably not less than 90%, more preferably not less than 95%, and even more preferably 100%.

TABLE 2

| | | | Comparative Examples | | | |
|---|---|---|---|---|---|---|
| | | | 1 | 2 | 3 | 4 |
| Treatment condition | Treatment method | | Without treatment | Flame | Flame | Flame |
| | Speed (mm/s) | | — | 1000 | 500 | 700 |
| | Distance (mm) | | — | 20 | 20 | 15 |
| | Number of treatments | | — | 1 | 1 | 3 |
| Surface free energy in each treatment | First treatment | $\gamma^{d1}$ | 28.4 | 31.8 | 35.3 | 35.5 |
| | | $\gamma^{p1}$ | 0.7 | 0.8 | 29.2 | 2.6 |
| | | $\gamma^{1}$ | 29.1 | 32.6 | 64.5 | 38.1 |
| | Second treatment | $\gamma^{d2}$ | | | | 37.2 |
| | | $\gamma^{p2}$ | | | | 3.1 |
| | | $\gamma^{2}$ | | | | 40.3 |
| | Third treatment | $\gamma^{d3}$ | | | | 40.2 |
| | | $\gamma^{p3}$ | | | | 3.3 |
| | | $\gamma^{3}$ | | | | 43.5 |
| | $\gamma^{d}/\gamma^{d0}$ | | — | 1.1 | 1.2 | 1.4 |
| | $\gamma^{p}/\gamma^{p0}$ | | — | 1.1 | 41.7 | 4.7 |
| Adhesion | Initial | Failure state | x AF100 | Marginal to good CF70 AF30 | Marginal CF55 AF45 | Poor AF100 |
| | | Failure strength (MPa) | 0.3 | 2.3 | 1.8 | 0.2 |
| | After heat aging resistance | Failure state | Poor AF100 | Poor AF100 | Poor AF100 | Poor AF100 |
| | | Failure strength (MPa) | 0.2 | 0.3 | 0.6 | 0.2 |

| | | | Examples | | | | |
|---|---|---|---|---|---|---|---|
| | | | 1 | 2 | 3 | 4 | 5 |
| Treatment condition | Treatment method | | Flame | Flame | ITRO | Plasma | Corona |
| | Speed (mm/s) | | 700 | 700 | 600 | 150 | 100 |
| | Distance (mm) | | 20 | 20 | 20 | 10 | 10 |
| | Number of treatments | | 2 | 3 | 2 | 2 | 2 |
| Surface free energy in each treatment | First treatment | $\gamma^{d1}$ | 33.7 | 33.7 | 37.8 | 35.8 | 36.8 |
| | | $\gamma^{p1}$ | 4.0 | 4.0 | 2.7 | 14.6 | 12.5 |
| | | $\gamma^{1}$ | 37.7 | 37.7 | 40.5 | 50.4 | 49.3 |
| | Second treatment | $\gamma^{d2}$ | 37.2 | 37.2 | 38.3 | 36.0 | 37.7 |
| | | $\gamma^{p2}$ | 18.0 | 18.0 | 3.2 | 19.7 | 19.6 |
| | | $\gamma^{2}$ | 55.2 | 55.2 | 41.5 | 55.7 | 57.3 |
| | Third treatment | $\gamma^{d3}$ | | 33.1 | | | |
| | | $\gamma^{p3}$ | | 7.5 | | | |
| | | $\gamma^{3}$ | | 40.6 | | | |
| | $\gamma^{d}/\gamma^{d0}$ | | 1.3 | 1.2 | 1.3 | 1.3 | 1.3 |
| | $\gamma^{p}/\gamma^{p0}$ | | 25.7 | 10.7 | 4.6 | 28.1 | 28.0 |
| Adhesion | Initial | Failure state | Excellent CF100 | Excellent CF100 | Excellent CF100 | Excellent CF100 | Excellent CF100 |
| | | Failure strength (MPa) | 4.5 | 3.4 | 3.5 | 4.0 | 3.6 |
| | After heat aging resistance | Failure state | Excellent CF100 | Good CF90 AF10 | Excellent CF100 | Excellent CF100 | Excellent CF100 |
| | | Failure strength (MPa) | 3.9 | 2.6 | 3.2 | 3.4 | 3.0 |

Treatment Condition

In Table 2, "treatment condition" is as follows.

Flame Treatment

In Table 2, the flame treatment is as follows.

The flame treatment was performed by using a burner (gas pressure: 0.4 MPa) under conditions (speed, distance, and the number of treatments) shown in Table 2. Specifically, a burner was moved over a fixed substrate. Thus, the burner (flame) was swept over the substrate.

Herein, the speed is the speed in the flame treatment. Specifically, the speed is the speed (mm/s) of the burner moved over the fixed substrate. The distance is the distance (mm) between the burner and the substrate. The number of treatments is the number of single sweeping treatments. Specifically, the number of treatments is the number of sweeping the burner (flame). For example, a case where the number of treatments is "1" means that the burner is swept from one end to the other end of the substrate once. A case where the number of treatments is "2" means that the burner is swept from one end to the other end of the substrate once, and then swept from the other end to the end of the substrate once.

ITRO Treatment

In Table 2, the ITRO treatment is as follows.

The ITRO treatment was performed by using a treatment device available from ITRO Co., Ltd. (gas pressure: 1.2

MPa) under the conditions (speed, distance, and the number of treatments) shown in Table 2.

Herein, the speed is the speed in the ITRO treatment. Specifically, the speed is the speed (mm/s) of the burner moved over the fixed substrate. The distance is the distance (mm) between the burner and the substrate. The number of treatments is the number of single ITRO treatments. Specifically, the number of treatments is the number of sweeping the burner (flame). For example, a case where the number of treatments is "1" means that the burner is swept from one end to the other end of the substrate once. A case where the number of treatments is "2" means that the burner is swept from one end to the other end of the substrate once, and then swept from the other end to the end of the substrate once.

Plasma Treatment

In Table 2, the plasma treatment is as follows.

The plasma treatment was performed by using a treatment device available from Plasmatreat (gas type: air, output: 23 kHz) under conditions (speed, distance, and the number of treatments) shown in Table 2.

Herein, the speed is the speed in the plasma treatment. Specifically, the speed is the speed (mm/s) of a plasma discharge nozzle moved over the substrate. The distance is the distance (mm) between the plasma discharge nozzle and the substrate. The number of treatments is the number of single plasma treatments. Specifically, the number of treatments is the number of sweeping a plasma discharge nozzle (plasma discharge). For example, a case where the number of treatments is "1" means that the plasma discharge nozzle is swept from one end to the other end of the substrate once. A case where the number of treatments is "2" means that the plasma discharge nozzle is swept from one end to the other end of the substrate once, and then swept from the other end to the end of the substrate once.

Corona Treatment

In Table 2, the corona treatment is as follows.

The corona treatment was performed by using a treatment device available from Navitas Co., Ltd., under the conditions (speed, distance, and the number of treatments) shown in Table 2.

Herein, the speed is the speed in the corona treatment. Specifically, the speed is the speed (mm/s) of a corona discharge nozzle moved over the substrate. The distance is the distance (mm) between the corona discharge nozzle and the substrate. The number of treatments is the number of single corona treatments. Specifically, the number of treatments is the number of sweeping a corona discharge nozzle (corona discharge). For example, a case where the number of treatments is "1" means that the corona discharge nozzle is swept from one end to the other end of the substrate once. A case where the number of treatments is "2" means that the corona discharge nozzle is swept from one end to the other end of the substrate once, and then swept from the other end to the end of the substrate once.

Surface Free Energy

In Table 2, "surface free energy in each treatment" is as follows.

$\gamma^{d1}$: non-polar component of surface free energy after the first treatment (single dry treatment)

$\gamma^{p1}$: polar component of surface free energy after the first treatment (single dry treatment)

$\gamma^{1}$: surface free energy ($\gamma^{d1}+\gamma^{p1}$) after the first treatment (single dry treatment)

$\gamma^{d2}$: non-polar component of surface free energy after the second treatment (single dry treatment)

$\gamma^{p2}$: polar component of surface free energy after the second treatment (single dry treatment)

$\gamma^{2}$: surface free energy ($\gamma^{d2}+\gamma^{p2}$) after the second treatment (single dry treatment)

$\gamma^{d3}$: non-polar component of surface free energy after the third treatment (single dry treatment)

$\gamma^{p3}$: polar component of surface free energy after the third treatment (single dry treatment)

$\gamma^{3}$: surface free energy ($\gamma^{d3}+\gamma^{p3}$) after the third treatment (single dry treatment)

$\gamma^{d1}$, $\gamma^{p1}$, and $\gamma^{1}$ in Comparative Example 1 were values of substrate formed from a polypropylene composite material (R-200G, available from Prime Polymer Co., Ltd.) that was not subjected to a dry treatment.

The method of determining the surface free energy (non-polar component and polar component) is as described above.

$\gamma^{d}/\gamma^{d0}$, $\gamma^{p}/\gamma^{p0}$

In Table 2, "$\gamma^{d}/\gamma^{d0}$" is $\gamma^{d}/\gamma^{d0}$ defined by the condition X and "$\gamma^{p}/\gamma^{p0}$" is $\gamma^{p}/\gamma^{p0}$ defined by the condition Y.

Herein, $\gamma^{d}$ is the non-polar component of surface free energy after the final treatment (single dry treatment). For example, in Example 1, the number of treatments is 2. Therefore, $\gamma^{d}$ is equal to $\gamma^{d2}$. $\gamma^{p}$ is the polar component of surface free energy after the final treatment (single dry treatment). For example, in Example 1, the number of treatments is 2. Therefore, $\gamma^{p}$ is equal to $\gamma^{p2}$.

Since $\gamma^{d0}$ is the non-polar component of surface free energy before the dry treatment, $\gamma^{d0}$ is the same as $\gamma^{d1}$ in Comparative Example 1. Since $\gamma^{p0}$ is the polar component of surface free energy before the dry treatment, $\gamma^{p0}$ is the same as $\gamma^{p1}$ in Comparative Example 1.

For example, in Example 1, $\gamma^{d}/\gamma^{d0}$ is 37.2/2.84 or 1.3, and $\gamma^{p}/\gamma^{p0}$ is 18.0/0.7 or 25.7.

As found from Table 2, a member surface-treated by a surface treatment method of this Example in which a dry treatment was performed so as to satisfy the specific conditions exhibited excellent adhesion after formation of a multilayer member.

According to comparison between Examples 1 and 2, the adhesion after the heat resistance test in Example 1 in which the surface free energy (non-polar component+polar component) of the surface subjected to the single dry treatments is increased with the number of the single dry treatments increased in the whole treatment process of the dry treatment ($\gamma^{1}$ is greater than $\gamma^{0}$ and $\gamma^{2}$ is greater than $\gamma^{1}$) is more excellent than that in Example 2 in which the surface free energy (non-polar component+polar component) of the surface subjected to the single dry treatments is not necessarily increased with the number of the single dry treatments increased in the whole treatment process of the dry treatment ($\gamma^{1}$ is greater than $\gamma^{0}$, $\gamma^{2}$ is greater than $\gamma^{1}$, and $\gamma^{3}$ is not greater than $\gamma^{2}$).

On the other hand, the members surface-treated by a surface treatment method in Comparative Examples 2 to 4 in which a dry treatment was performed so as not to satisfy the specific conditions exhibited insufficient adhesion.

The invention claimed is:

1. A member surface treatment method for treating a surface of a member containing a crystallizable thermoplastic resin by a dry treatment, wherein the dry treatment is performed to satisfy conditions X and Y:

Condition X: $\gamma^{d}/\gamma^{d0}$ is not less than 1.0 and less than 1.4; and Condition Y: $\gamma^{p}/\gamma^{p0}$ is not less than 1.2 and less than 40, where $\gamma^{d0}$ is a non-polar component of surface free energy of the surface before the dry treatment, $\gamma^{d}$ is a non-polar component of surface free energy of the surface after the dry treatment, $\gamma^{p0}$ is a polar component of surface free energy of the surface before the dry treatment, and $\gamma^p$ is a polar component of surface free energy of the surface after the dry treatment.

2. The member surface treatment method according to claim 1, wherein
the dry treatment includes a plurality of single dry treatments, and
the surface free energy of the surface subjected to the single dry treatments is increased with the number of the single dry treatments increased in the whole treatment process of the dry treatment.

3. A method for producing a multilayer member having a first member containing a crystallizable thermoplastic resin, an adhesion layer, and a second member in this order, the method comprising:
a surface treatment step of performing a surface treatment on a surface of the first member by the member surface treatment method according to claim 2;
an adhesive application step of applying an adhesive to the surface of the first member subjected to the dry treatment without a primer composition, to form an adhesive layer on the surface of the first member; and
an adhering step of adhering the second member to the adhesive layer.

4. The method for producing a multilayer member according to claim 3, further comprising a surface treatment step of performing a surface treatment on a surface of the second member before the adhering step by the member surface treatment method,
wherein the second member contains a crystallizable thermoplastic resin, and
in the adhering step, the surface of the second member in which the surface treatment is performed is adhered to the adhesive layer.

5. The method for producing a multilayer member according to claim 3, further comprising a surface treatment step of performing a surface treatment on a surface of the second member before the adhering step by a second member surface treatment method for treating the second member by a second dry treatment, wherein:
the second dry treatment is performed to satisfy conditions $X_2$ and $Y_2$:
Condition $X_2$: $\gamma^d_2/\gamma^{d0}_2$ is not less than 1.0 and less than 1.4; and
Condition $Y_2$: $\gamma^p_2/\gamma^{p0}_2$ is not less than 1.2 and less than 40,
where $\gamma^{d0}$ is a second non-polar component of surface free energy of the surface before the dry treatment, $\gamma^d_2$ is a second non-polar component of surface free energy of the surface after the dry treatment, $\gamma^{p0}_2$ is a second polar component of surface free energy of the surface before the dry treatment, and $\gamma^p_2$ is a second polar component of surface free energy of the surface after the dry treatment;
the second member contains a crystallizable thermoplastic resin; and
in the adhering step, the surface of the second member in which the surface treatment is performed is adhered to the adhesive layer.

6. A method for producing a multilayer member having a first member containing a crystallizable thermoplastic resin, an adhesion layer, and a second member in this order, the method comprising:
a surface treatment step of performing a surface treatment on a surface of the first member by the member surface treatment method according to claim 1;
an adhesive application step of applying an adhesive to the surface of the first member subjected to the dry treatment without a primer composition, to form an adhesive layer on the surface of the first member; and
an adhering step of adhering the second member to the adhesive layer.

7. The method for producing a multilayer member according to claim 6, further comprising a surface treatment step of performing a surface treatment on a surface of the second member before the adhering step by the member surface treatment method,
wherein the second member contains a crystallizable thermoplastic resin, and
in the adhering step, the surface of the second member in which the surface treatment is performed is adhered to the adhesive layer.

8. The method for producing a multilayer member according to claim 6, further comprising a surface treatment step of performing a surface treatment on a surface of the second member before the adhering step by a second member surface treatment method for treating the second member by a second dry treatment, wherein:
the second dry treatment is performed to satisfy conditions $X_2$ and $Y_2$:
Condition $X_2$: $\gamma^d_2/\gamma^{d0}_2$ is not less than 1.0 and less than 1.4; and
Condition $Y_2$: $\gamma^p_2/\gamma^{p0}_2$ is not less than 1.2 and less than 40,
where $\gamma^{d0}$ is a second non-polar component of surface free energy of the surface before the dry treatment, $\gamma^d_2$ is a second non-polar component of surface free energy of the surface after the dry treatment, $\gamma^{p0}_2$ is a second polar component of surface free energy of the surface before the dry treatment, and $\gamma^p_2$ is a second polar component of surface free energy of the surface after the dry treatment;
the second member contains a crystallizable thermoplastic resin;
the second dry treatment includes a plurality of single dry treatments;
the surface free energy of the surface subjected to the single dry treatments is increased with the number of the single dry treatments increased in the whole treatment process of the second dry treatment; and
in the adhering step, the surface of the second member in which the surface treatment is performed is adhered to the adhesive layer.

* * * * *